United States Patent [19]
Hart, Sr. et al.

[11] Patent Number: 4,668,131

[45] Date of Patent: May 26, 1987

[54] BULK MATERIAL CONVEYING SYSTEM

[76] Inventors: William F. Hart, Sr., 3707 Hillsboro Rd., Louisville, Ky. 40207; William F. Hart, Jr., 9236 St. Moritz Dr., Louisville, Ky. 40291

[21] Appl. No.: 704,718

[22] Filed: Feb. 25, 1985

[51] Int. Cl.⁴ ............................................. B65G 53/66

[52] U.S. Cl. ....................................... 406/23; 406/39; 406/164; 406/44; 406/172

[58] Field of Search .................. 406/172, 115, 116, 38, 406/39, 164–167, 23, 44; 55/302; 239/165; 414/717–718

[56] References Cited

U.S. PATENT DOCUMENTS

| | | | |
|---|---|---|---|
| 2,276,805 | 3/1942 | Tolman, Jr. | 406/172 |
| 2,703,733 | 3/1955 | Stueven | 406/167 X |
| 3,074,649 | 1/1963 | Atkinson | 239/165 |
| 3,169,038 | 2/1965 | Pendleton | 406/172 |
| 3,297,370 | 1/1967 | Moriarity | 406/172 |
| 3,423,130 | 1/1969 | Milner | 406/172 |
| 3,612,616 | 10/1971 | Stewart | 406/172 |
| 3,832,005 | 8/1974 | Hek | 406/172 |
| 3,942,561 | 3/1976 | Stoeffler | 141/66 |
| 4,352,608 | 10/1982 | Staller et al. | 406/116 |
| 4,372,713 | 2/1983 | Kean, Jr. | 406/172 |
| 4,394,108 | 7/1983 | Cook et al. | 414/718 X |

Primary Examiner—Jeffrey V. Nase
Attorney, Agent, or Firm—Maurice L. Miller, Jr.

[57] ABSTRACT

A system for pneumatically conveying a quantity of fluent particulate material from one holding tank or storage vessel to another is disclosed. A mobile frame is employed upon which is disposed an engine for operating a hydraulic pump and a vacuum blower. A material loading container in which an air permeable particle filter is disposed is pivotally connected to an adjustable boom mounted on the frame. The vacuum pump is removably connectable to the container through the filter such that a partial vacuum can be drawn upon the container to induce particulate matter to flow into the latter through a hose connected to a remote source of bulk material. Upon completion of the container filling operation, the vacuum pump is switched from its connection with the container so as to connect to ambient atmosphere while, at the same time, the filter is exposed to ambient atmosphere to backflush and clean coated material from the surface of the filter and permit a counterweighted plate to tilt open to discharge accumulated material from the base of the container. A hydraulic circuit for operation of the container, steering and driving of the frame, and adjustment of the boom is also disclosed.

16 Claims, 13 Drawing Figures

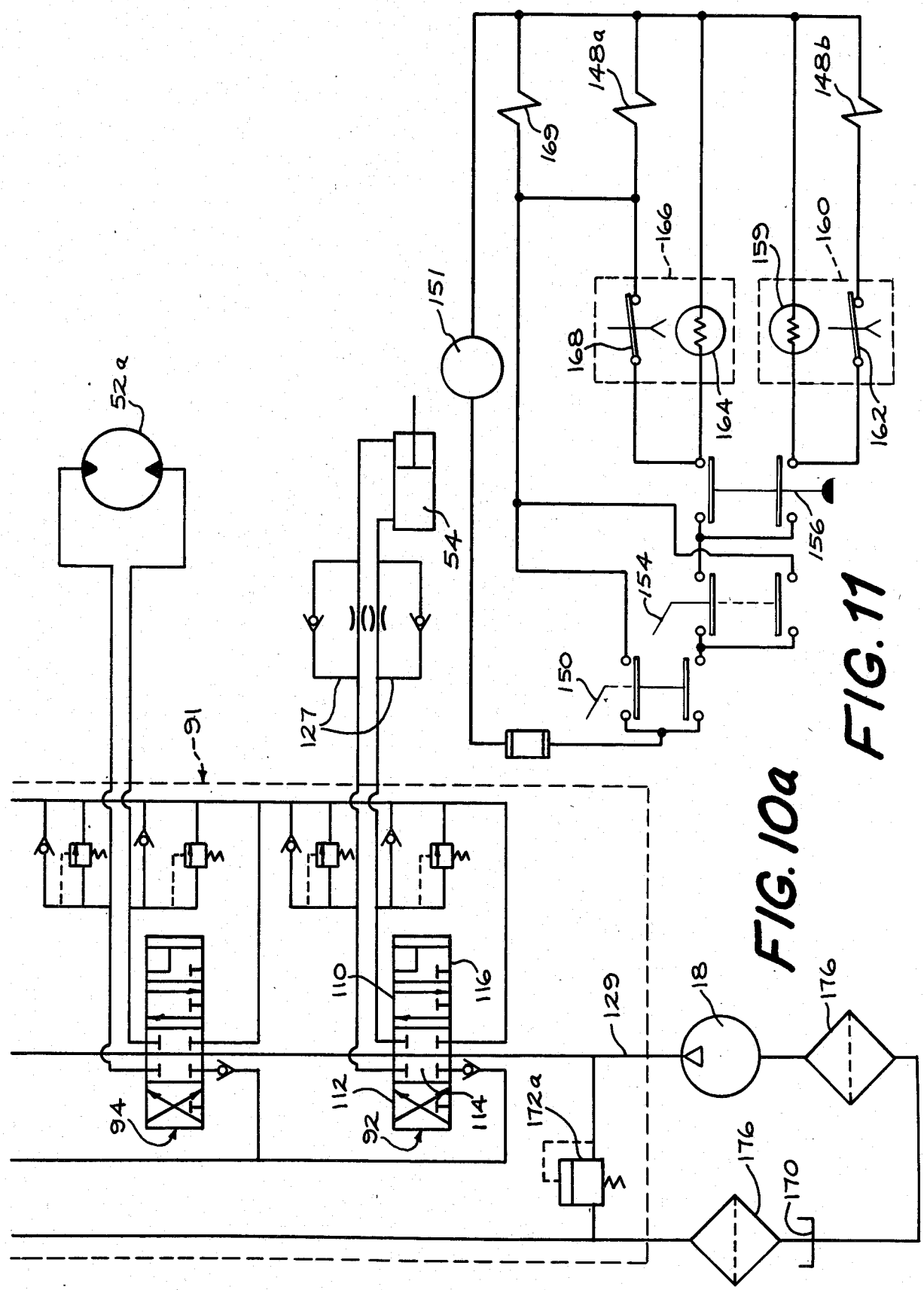

BULK MATERIAL CONVEYING SYSTEM

BACKGROUND OF THE INVENTION

This invention relates generally to a system for pneumatically conveying a batch of fluent particulate material from one holding tank or storage vessel to another. More particularly, this invention relates to a machine having a bulk material loading container in which an air permeable particle filter is disposed through which a vacuum is drawn on the container so as to induce a flow of such material therein from a remote source after which, the vacuum is interrupted and the container is exposed to atmospheric pressure for backflushing the filter and for discharging material from the container.

Generally speaking, such systems are known in the prior art. See U.S. Pat. No. 3,169,038 issued to F. P. Pendleton on Feb. 9, 1965 and U.S. Pat. No. 4,372,713 issued to James P. Kean, Jr. on Feb. 8, 1983.

The patent to Pendleton discloses what could be considered a loading container having such a filter disposed in an upper portion thereof. Compressed air is passed through the throat of a venturi tube, which tube communicates with the interior of the container through the filter so as to produce a partial vacuum therein for inducing the flow of bulk material into the container from a remote source. After the desired amount of material has been induced into the container, an inlet port through which the material flows is closed shutting off the further flow of material but compressed air continues to flow through the venturi for a time to increase the vacuum drawn on the container through the filter. After the desired high vacuum has been created, compressed air is removed from the venturi so that a heavy volume of atmospheric air rushes into the throat of the venturi and thence through the filter and into the container, whereby the filter is flexed by a rapid snapping action to shake off any coating of material that may be adhered to its outer surface.

The patent to Kean, Jr. discloses a bulk material loading container which contains what could be described as a two stage air permeable particle filter operated by a pair of air diverter valves. A vacuum pump is connectable to either or both filter stages and can be isolated from either or both stages depending upon the settings of the two diverter valves. Prior to the container filling operation, one diverter valve is set so as to permit ambient air to flow into the container through the first filter stage to backflush and clean the latter while the other valve is set so as to connect the pump to the second stage to draw the ambient air introduced into the container through first stage out of the container. After a time, the first mentioned diverter valve operates to isolate the first stage from ambient atmosphere and connect that stage to the vacuum pump such that a partial vacuum will then be drawn on the container through both stages to induce material to flow into the container from a remote source. After the container filling operation is completed, the second valve operates to isolate the second stage from the pump and expose that stage to ambient atmosphere, whereby the second stage is backflushed. During second stage backflushing, ambient air thus introduced into the container is withdrawn by the pump which is still connected to the first stage. Upon completion of the second stage backflushing operation, the first diverter valve again switches to also expose the first stage to ambient atmosphere at which time a counterweighted door, pivotally connected to the base of the container for sealing a discharge orifice, tilts open under the weight of material in the container to allow the accumulated material to be discharged.

The Pendleton device is complicated by the use of an air compressor in combination with a venturi to generate two different vacuum levels in the container during two successive time periods, the first being a low vacuum level for filling the container and the second being a high vacuum level necessary to cause sufficient inrush of ambient air through the filter upon removal of the second level to adequately backflush and clean the filter.

The Kean, Jr. device is complex in that it employs a two stage filter operated by a pair of air diverter valves which must execute four separate and distinct steps during each cycle of operation of the system. An additional difficulty encountered with the Kean, Jr. device is that material can not be discharged from the container during a filter backflushing operation.

By means of our invention, these and other difficulties encountered with prior art bulk material conveying systems are substantially overcome.

SUMMARY OF THE INVENTION

It is an object of the subject invention to provide a fluent material loading machine.

It is a further object of our invention to provide a hydraulic circuit for controlling the operation of a fluent material loading machine.

Briefly, in accordance with our invention, there is provided a system for conveying a quantity of fluent material which includes a frame, a boom mounted on the frame, and a container connected to the boom defining a hollow chamber therein which is adapted to receive and thereafter discharge a quantity of fluent material. The container has an air permeable particle filtration means disposed in the chamber, a first air inlet means communicating with the chamber through the filtration means, and a fluent material inlet means communicating with the chamber and bypassing the filtration means. The container also contains a fluent material discharge means for closing to permit the chamber to be charged with a fluent material and for opening to permit a quantity of fluent material to be discharged from the chamber. The system further includes vacuum inducing means removably connectable to the first air inlet means for drawing a partial vacuum on the chamber through the filtration means. Lastly, the system includes switching means connected between the first air inlet means and the inducing means for, alternately, connecting the inducing means to the first air inlet means to draw a quantity of fluent material from a remote source into the chamber through the material inlet means, and for disconnecting the inducing means from the first air inlet means while simultaneously connecting the inducing means and the first air inlet means to ambient atmosphere to pneumatically backflush the filtration means and protect the inducing means from overload. The discharge means is closed while the inducing means is connected to the first air inlet means and is openable when the first air inlet means is connected to ambient atmosphere to permit discharge of a quantity of material from the chamber.

These and other objects, features and advantages of the present invention will become apparent to those skilled in the art from the following detailed description

BRIEF DESCRIPTION OF THE DRAWINGS

FIG. 11 shows a schematic diagram of an electrical circuit for controlling the operating mode of the loading container of the machine of FIGS. 1-3.

DESCRIPTION OF THE PREFERRED EMBODIMENT

Figure 1:
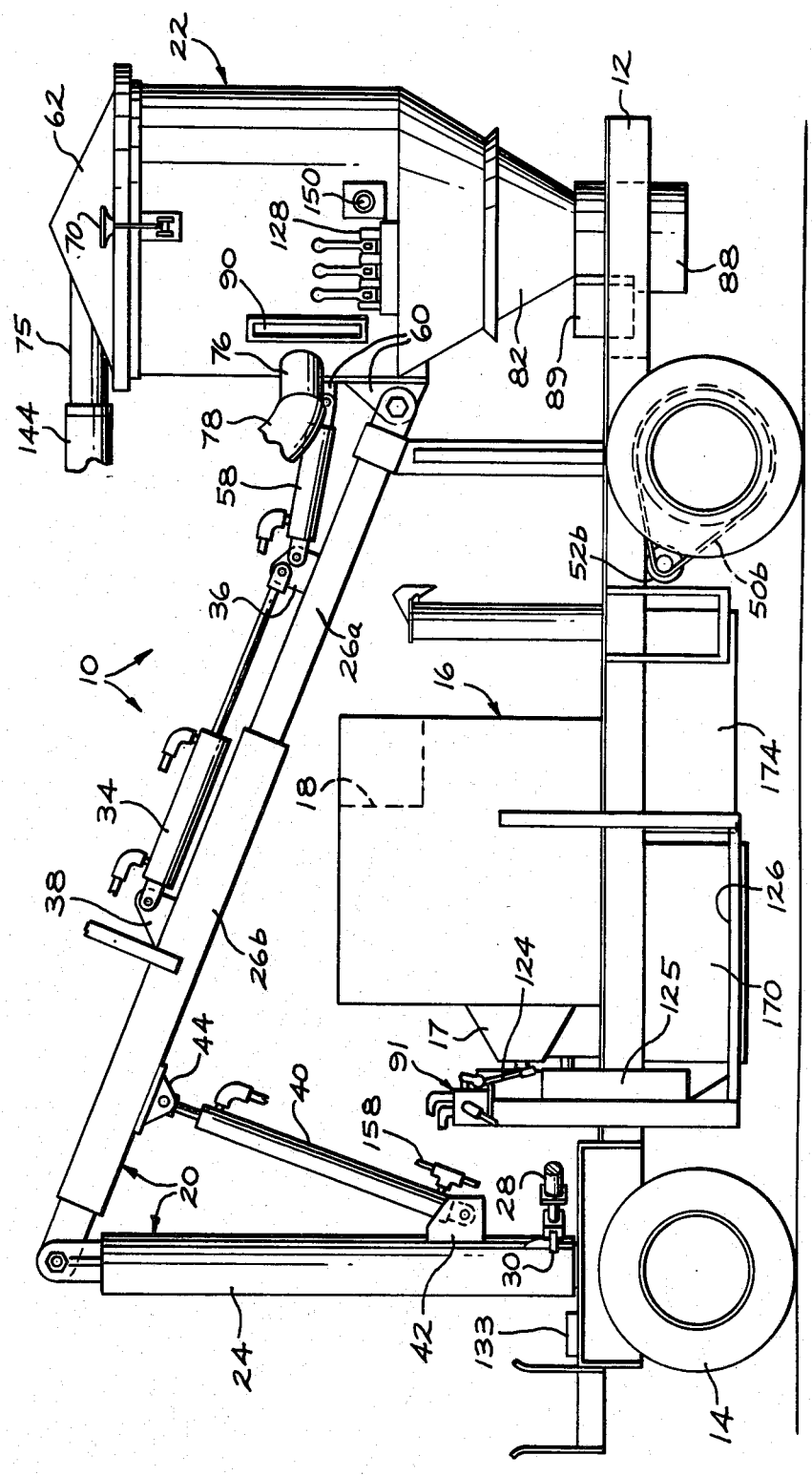
FIG. 1 shows a side elevation view of a fluent material loading machine, thus illustrating one preferred embodiment of our invention.
Figure 2:
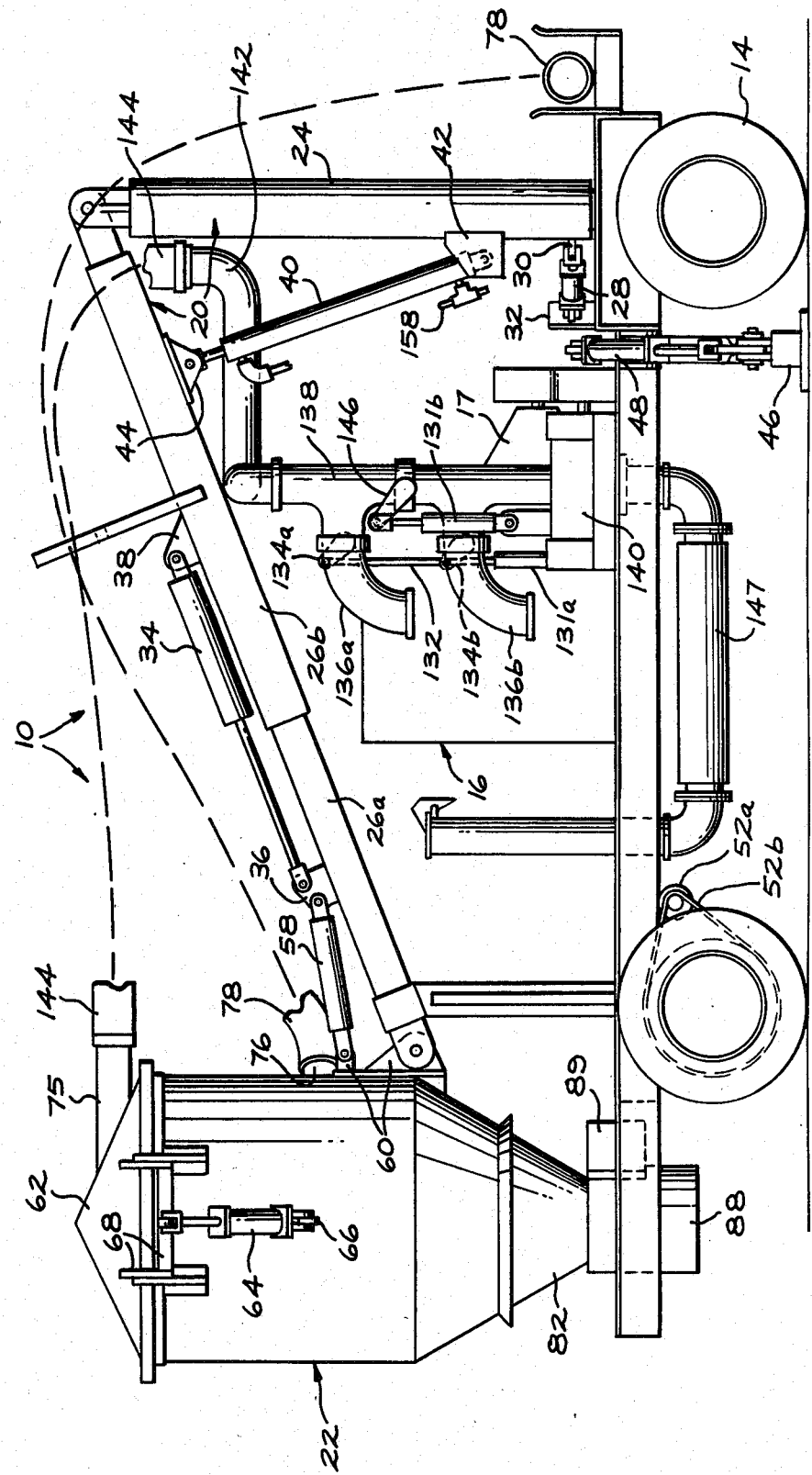
FIG. 2 shows a second side elevation view of the machine of FIG. 1 as viewed from the side opposite that shown in the latter figure.
Figure 3:
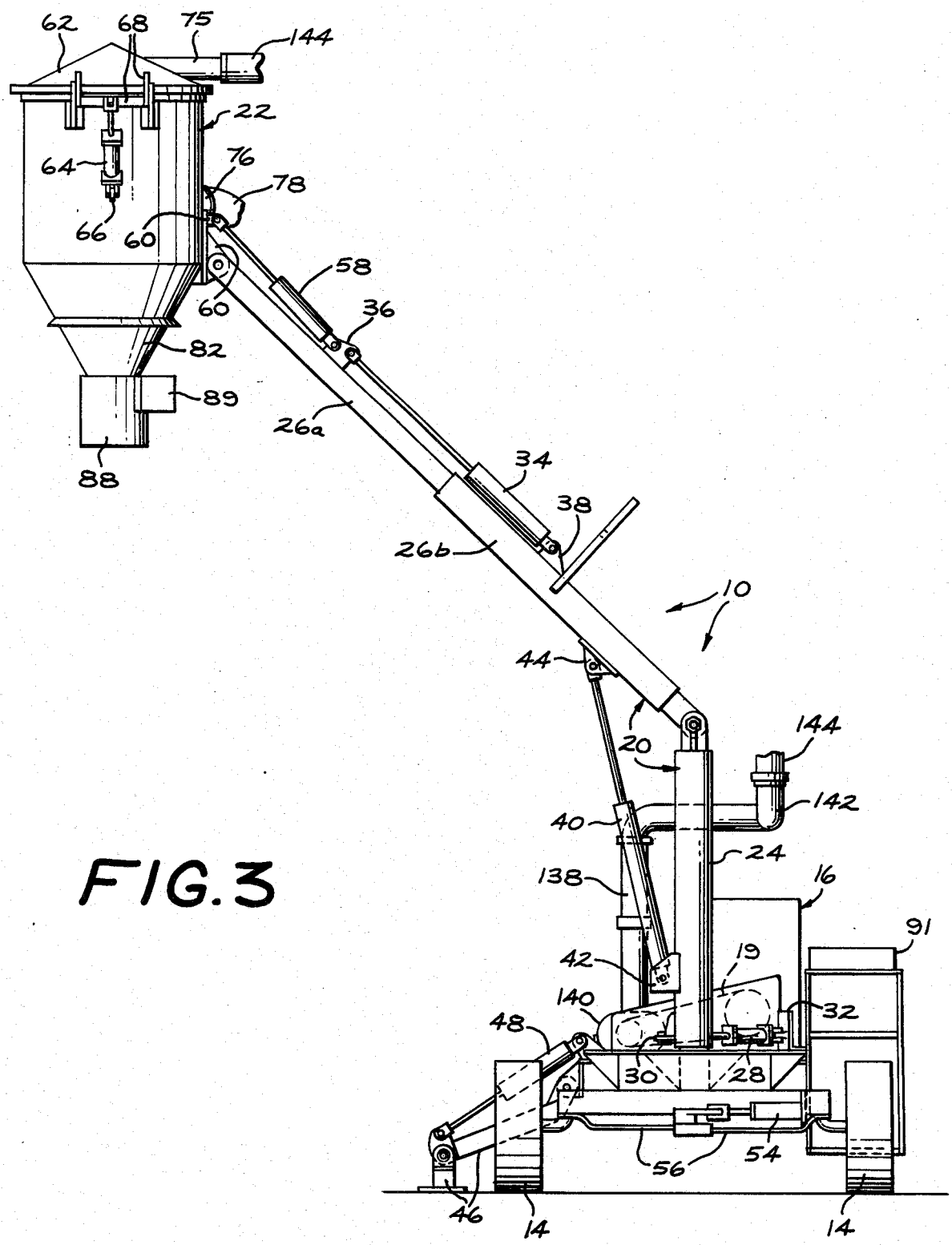
FIG. 3 shows an end elevation view of the machine of FIGS. 1-2 wherein a material loading container and supporting boom shown in a lowered position in the latter figures is shown in an elevated position.

Referring now to FIGS. 1-9, there is shown in one preferred embodiment of my invention, a mobile and self-propelled, fluent or bulk material loading machine 10 which is particularly adapted for loading and unloading granulated or particulate materials into and from bulk tank trucks, railroad cars and the like. The machine 10 includes a frame 12 having wheels 14 for providing a mobile platform upon which is disposed an engine 16, such as a conventional diesel type, having a power take off 17, a hydraulic fluid pump 18 driven by the engine and contained within the engine housing, and an adjustable boom 20 having a bulk material loading container 22 vertically pivotally attached to the free end thereof. The boom 20 is provided in two sections, the first being a horizontally rotatable vertically extending section 24 of fixed height, and a second being a telescopically adjustable section containing inner and outer elements 26a, 26b, respectively. The outer element 26b is pivotally attached to an upper end of the section 24 so that the telescopic section can be tilted vertically from a lower position as shown in FIGS. 1-2 to a raised position such as shown in FIG. 3. The vertical section 24 is rotated by means of a hydraulic cylinder 28 whose piston rod is horizontally pivotally connected to a bracket 30 welded to a side of the section 24. The other end of the cylinder 28 is horizontally pivotally connected to a supporting bracket 32 attached to an upper surface of the frame 12. The telescoping boom elements 26a,b are extended and retracted relative to one another by means of a hydraulic cylinder 34 connected between brackets 36, 38 fixedly connected to the elements 26a,b, respectively. The section 26a,b is raised and lowered by means of a hydraulic cylinder 40 pivotally connected between brackets 42, 44 which are fixedly attached to the section 24 and element 26b, respectively.

The frame 12 is stabilized against tilting when the boom 20 is rotated, extended and lifted to lift the container 22 to a position such as shown in FIG. 3, by means of a vertically tiltable stabilizer leg 46 pivotally connected to one side of the frame 12. A hydraulic cylinder 48 controls the lifting and lowering of the leg 46 as required. The pair of wheels 14 located nearest the storage position of the container 22 (the rear wheels) are driven by means of a pair of chains 50a,b which are, in turn, operated by a pair of hydraulic motors 52a,b, respectively. The front wheels 14 are steered by means of a hydraulic cylinder 54 connected between a side of the frame 12 and a pair of tie rods 56 (See FIG. 3).

The container 22 may be leveled after being moved to various positions and heights by the boom 20 by means of a hydraulic cylinder 58 pivotally connected between the bracket 36 and a bracket 60 affixed to the side of the container. A container lid 62 may be opened or closed upon command by means of a hydraulic cylinder 64 pivotally connected between a bracket 66 located on the side of the container 22 and a bracket 68 attached to a peripheral edge portion of the lid. A manually operated latch 70 (FIG. 1) permits the lid 62 to be tightly closed against the container body to maintain a partial vacuum therein as later explained.

Figure 5:
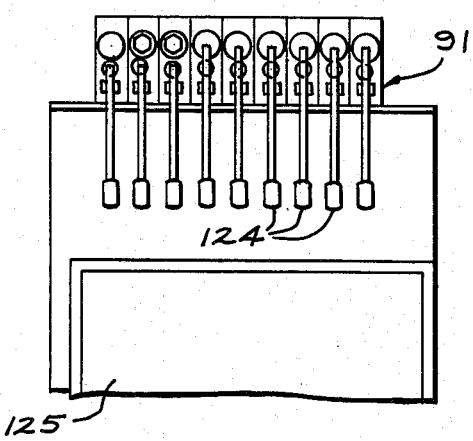
FIG. 5 shows a fragmented elevation view of a main control console portion of the machine of FIGS. 1-3.
Figure 6:
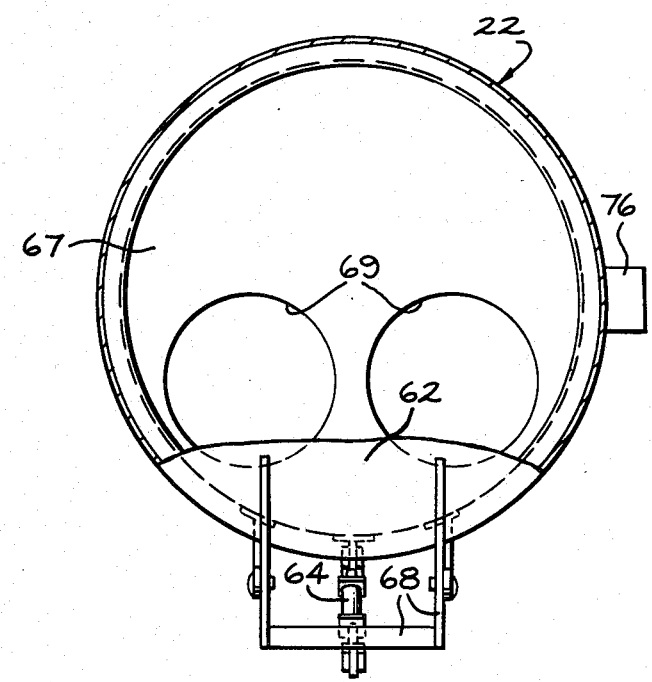
FIG. 6 shows a top plan view of the loading container portion of the machine of FIGS. 1-3 with a portion of its lid torn away to expose certain interior structure.
Figure 9:
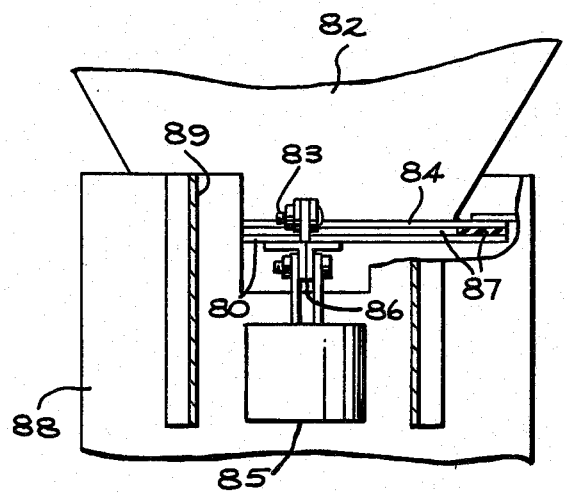
FIG. 9 shows a cross-sectional elevation view of the lower portion of the container of FIGS. 1-3 as viewed along cross-section lines 8—8 of FIG. 8.
Figure 7:
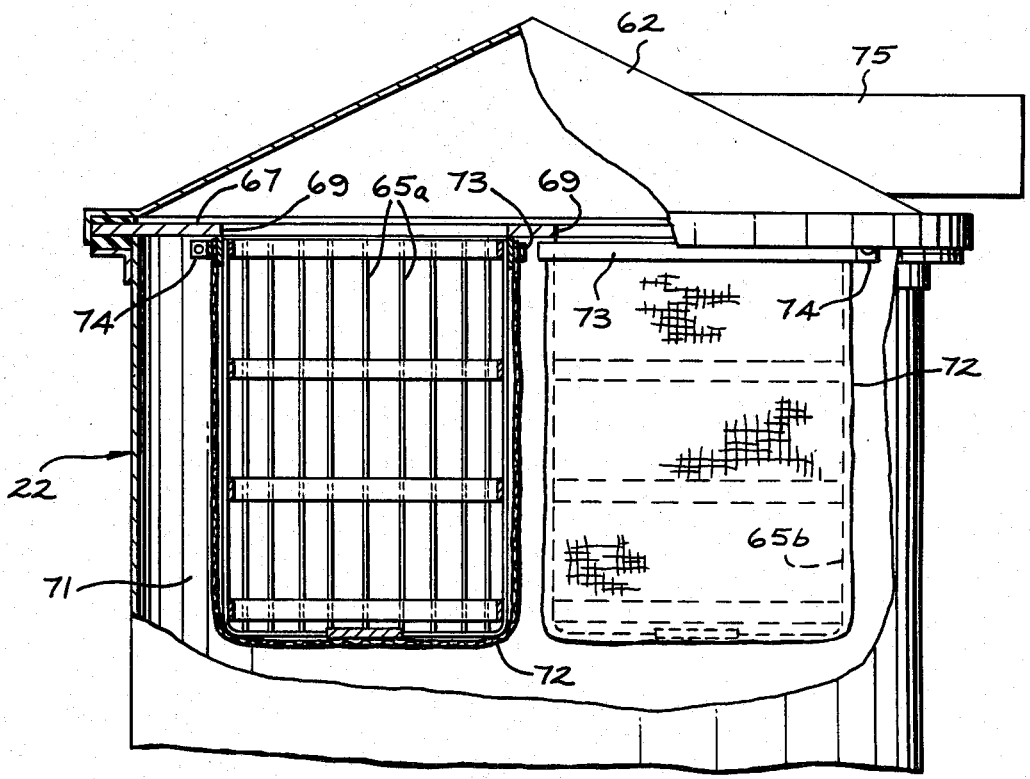
FIG. 7 shows a fragmented elevation view of an upper portion of the container of FIGS. 1-3 with a surface portion torn away to expose certain interior components.
Figure 8:
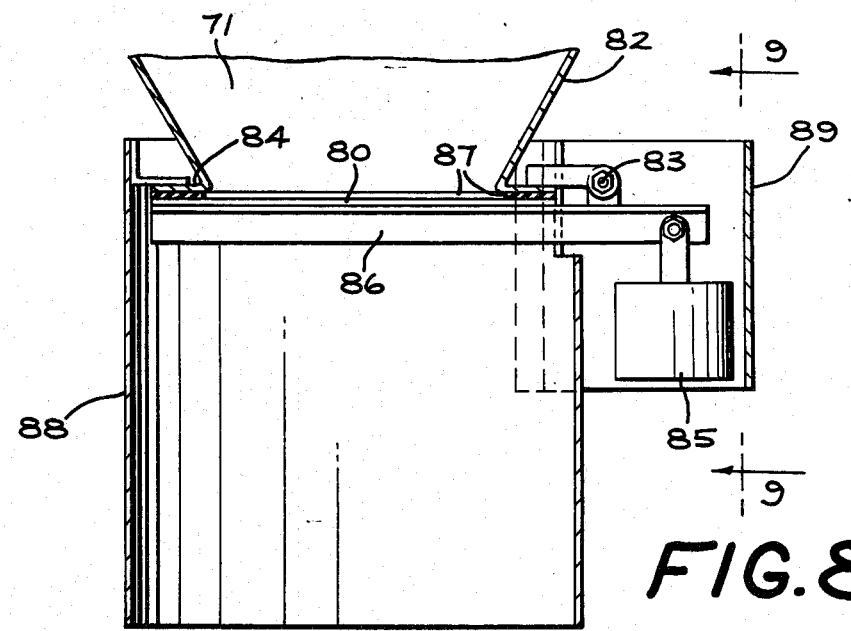
FIG. 8 shows a cross-sectional elevation view of a lower portion of the container of FIGS. 1-3.

The loading container 22 contains a pair of cylindrically shaped frames 65a,b made of elongated steel rods held in place by circular steel bands and connected to a lower surface or plate 67 of the lid 62 so as surround openings 69 in the plate and extend downwardly into an upper interior portion of a chamber 71 when the lid is closed against the container body as illustrated in FIG. 5. An air permeable filter bag 72 is disposed over each of the frames 65a,b from the lower end of the frames upwardly and is held in place at the top of each of the frames by means of a flexible steel band 73 tightened by a threaded fastener 74. During the process of filling the loading container 22 with granulated or fluent material, a partial vacuum is drawn through a pipe 75 and through each of the filter bags 72 and frames 65a,b upon the chamber 71 and a material inlet pipe 76. The inlet pipe 76 is connected by means of a flexible flow line 78 to a remote source of material to be loaded into the container 22. Most of the material siphoned through the pipe 76 falls into a lower portion of the chamber 71 upon a plate 80 covering an outlet or discharge opening on the lower end of a conical section 82 of the container and builds up to a maximum level approximately even with the pipe 76. However, some of this material may be drawn upwardly through the chamber 71 and become coated on the filter bags 72 under the influence of the partial vacuum drawn on the pipe 75. The plate 80 is pivotally connected as at 83 to circular lip 84 formed around the discharge opening in the bottom of the conical section 82 (See FIGS. 8-9). The plate 80 is counterweighted about the pivot pin 83 by means of a mass 85 pivotally connected to and suspended from a pair of angle irons 86 which are, in turn, welded to the bottom surface of the plate 80. The mass 85 and its moment arm distance from the pin 83 is selected so that, when the chamber 71 is empty and at atmospheric pressure, the plate 80 will be held closed against an annularly shaped gasket 87 mounted under and around the lip 84. Under the influence of a partial vacuum drawn on the chamber 71, the plate 80 will remain closed against the gasket 87 so as to seal the outlet opening in the base of the conical section 82 even as the chamber 71 fills to the maximum level with material. Thereafter, when the partial vacuum is broken and the chamber 71 is returned to atmospheric pressure, the weight of material bearing on the plate 80 will cause the latter to tilt open so that the material will be discharged from the base of the container 22. A hollow cylindrically shaped flue 88 extends below and around the discharge opening and is connected to and around the lip 84. The angle irons 86 extend outwardly beyond the underside of the plate 80 and through a rectangular opening in the flue 88 such that the mass 85 is suspended outside of the flue in a three-sided enclosure 89. A vertically elongated cite glass 90 is provided in the wall of the container 22 to permit visual monitoring of the level of bulk material in the container.

Figure 10B:
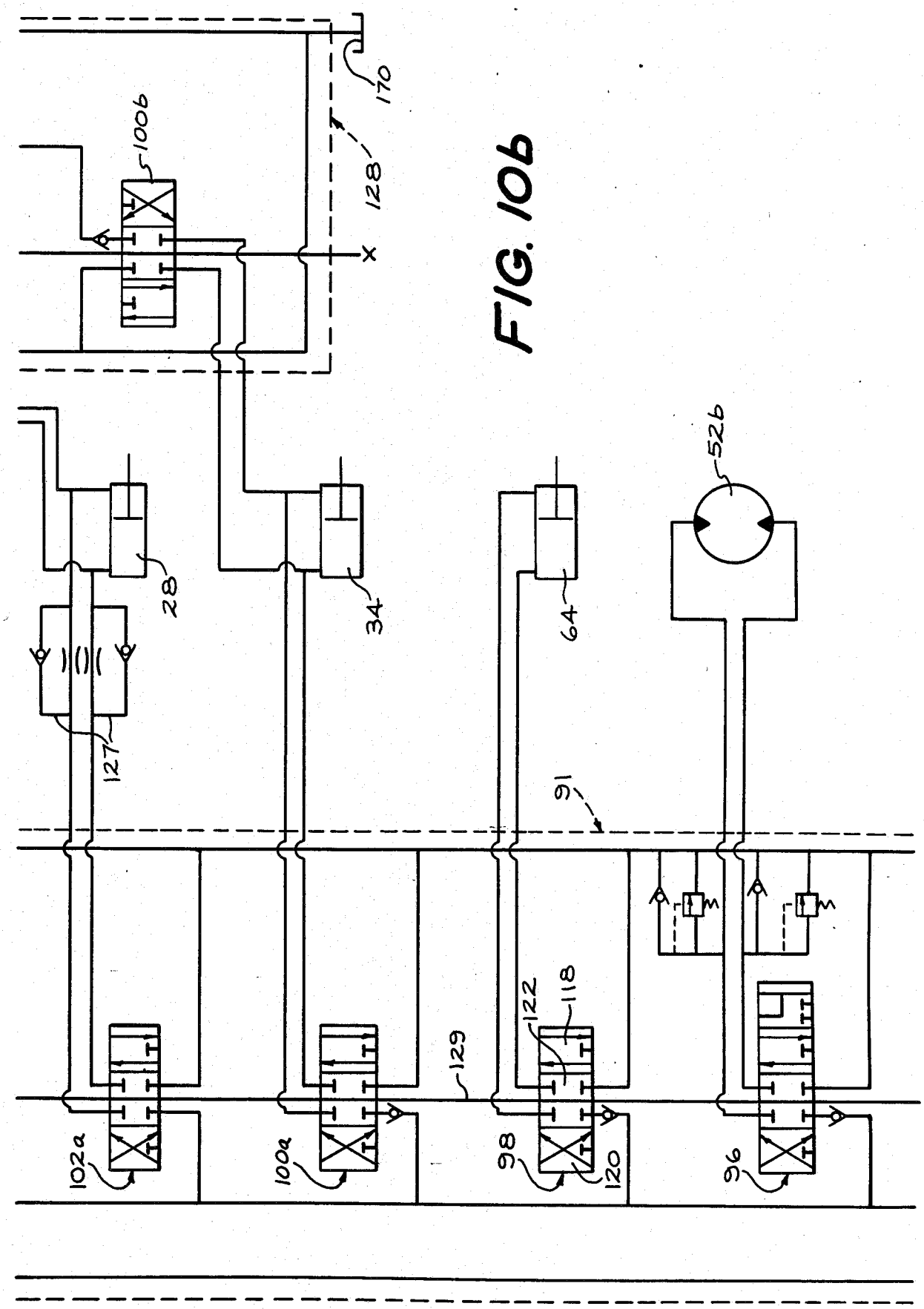
FIGS. 10a,b and c show, in combination, a single schematic diagram of a hydraulic control system used on the machine of FIGS. 1-3 as operated by the main control console of FIG. 5.
Figure 10C:
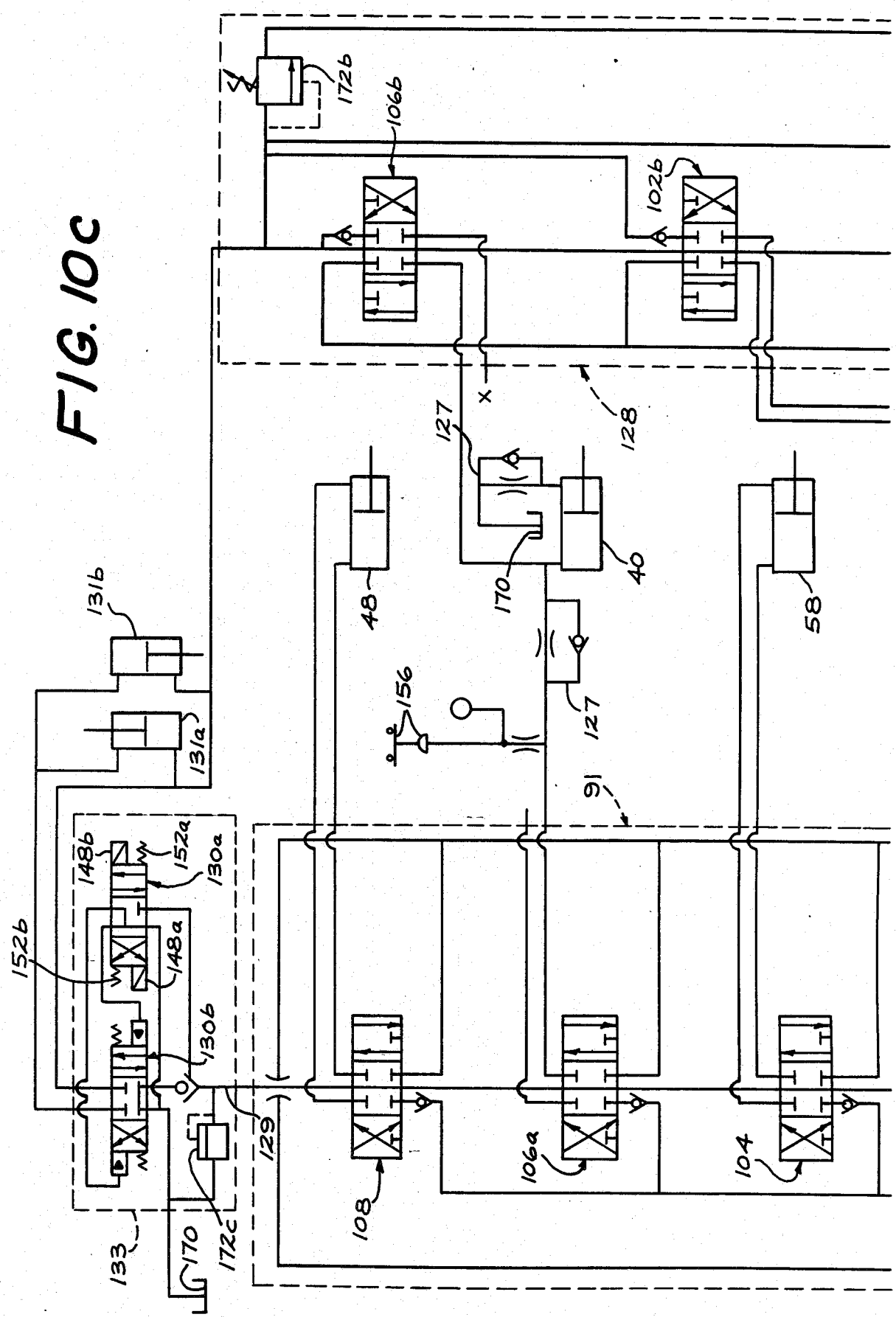

Referring also to the hydraulic circuit of FIGS. 10a–c, there is shown a valve body 91 (See also FIGS. 1, 3 and 5) which contains nine control valves 92, 94, 96, 98, 100a, 102a, 104, 106a and 108 for controlling the steering cylinder 54, the hydraulic drive motors 52a and 52b, the container lid lifting cylinder 64, the boom extend cylinder 34, the boom rotate cylinder 28, the container leveling cylinder 58, the boom lift cylinder 40 and the stabilization leg lift cylinder 48, respectively. The first three mentioned control valves 92–96 are of identical construction and contain four positions, namely, a forward position 110, a reverse position 112, a lock position 114, and a float position 116, as indicated in FIG. 10a with reference to the valve 92 only. Each of the valves 92–96 are shown in the lock positions wherein the steering cylinder 54 and the motors 52a, 52b are locked. The float positions 116 of these valves permit free steering of the front wheels and free rotation of all of the wheels 14 and are used when the frame 12 is to be pulled by another vehicle.

Each of the remaining six control valves 98, 100a, 102a, 104, 106a and 108 are identical to one another and contain three positions, namely, a forward position 118, a reverse position 120 and a lock position 122 as indicated in FIG. 10b with reference to the valve 98 only. These control valves are likewise shown in the lock position wherein the cylinders 64, 34, 28, 58, 40 and 48, respectively, are locked in specific positions. The cylinders 28, 34, 48, 58 and 64 are conventional double acting cylinders that require positive hydraulic pressure to one end or the other thereof in order to force a change in piston position. By contrast, the lift cylinder 40 for lifting and lowering the boom section 26a,b is a conventional single acting cylinder since that cylinder will retract to lower the section 26a,b due to the bearing weight of said section and the container 22 and requires a positive hydraulic force applied to only one side thereof to extend the same for lifting the section 26a,b. Each of the subject nine valves are manually switchable between states by means of nine levers or valve handles 124 (See FIGS. 1 and 5). The valve body 91 is conveniently located on top of a frame 125 on one end of an operator platform or running board 126. Each of the flow lines between the valves 92, 102 and 106 and the steering cylinder 54, the boom rotate cylinder 28 and the boom lifting cylinder 40, respectively, contain conventional flow control valves 127 to limit the speed of response of those cylinders and hence, of the speed of response of the resulting vehicular steering, rotational movement of the boom section 24 and lifting and lowering movement of the boom section 26a,b to levels low enough to permit emergency operator intervention when and if necessary and to minimize over-control.

The valve body 91 on the frame 12 constitutes the main hydraulic control station on the machine 10. A secondary control station consisting of a valve body 128 (FIGS. 1 and 10b, c) for controlling the boom rotate cylinder 28, the boom extend cylinder 34 and the boom lift cylinder 40 is attached to the side of the container 22 so that these boom functions may be finely adjusted by a workman standing atop a bulk tank to be loaded in order that the container outlet flue 88 may be precisely positioned over the bulk tank opening in a bulk tank to be loaded. Such a secondary control station is desirable since a workman located on the running board 126 is often not in a position to precisely position the flue 88 over a bulk tank opening, which opening is often well overhead and concealed from his view by the near upper edge of the bulk tank. The valves contained in the valve body 128 are 3-position control valves 100b, 102b and 106b and are identical in construction and function to the counterpart valves 100a, 102a and 106a, respectively, in the valve body 91 and are connected to the cylinders 34, 28 and 40, respectively, in the same manner. The valves 100b, 102b and 106b of FIGS. 10b,c, shown in locked positions, also have a forward and reverse positions.

Figure 4:
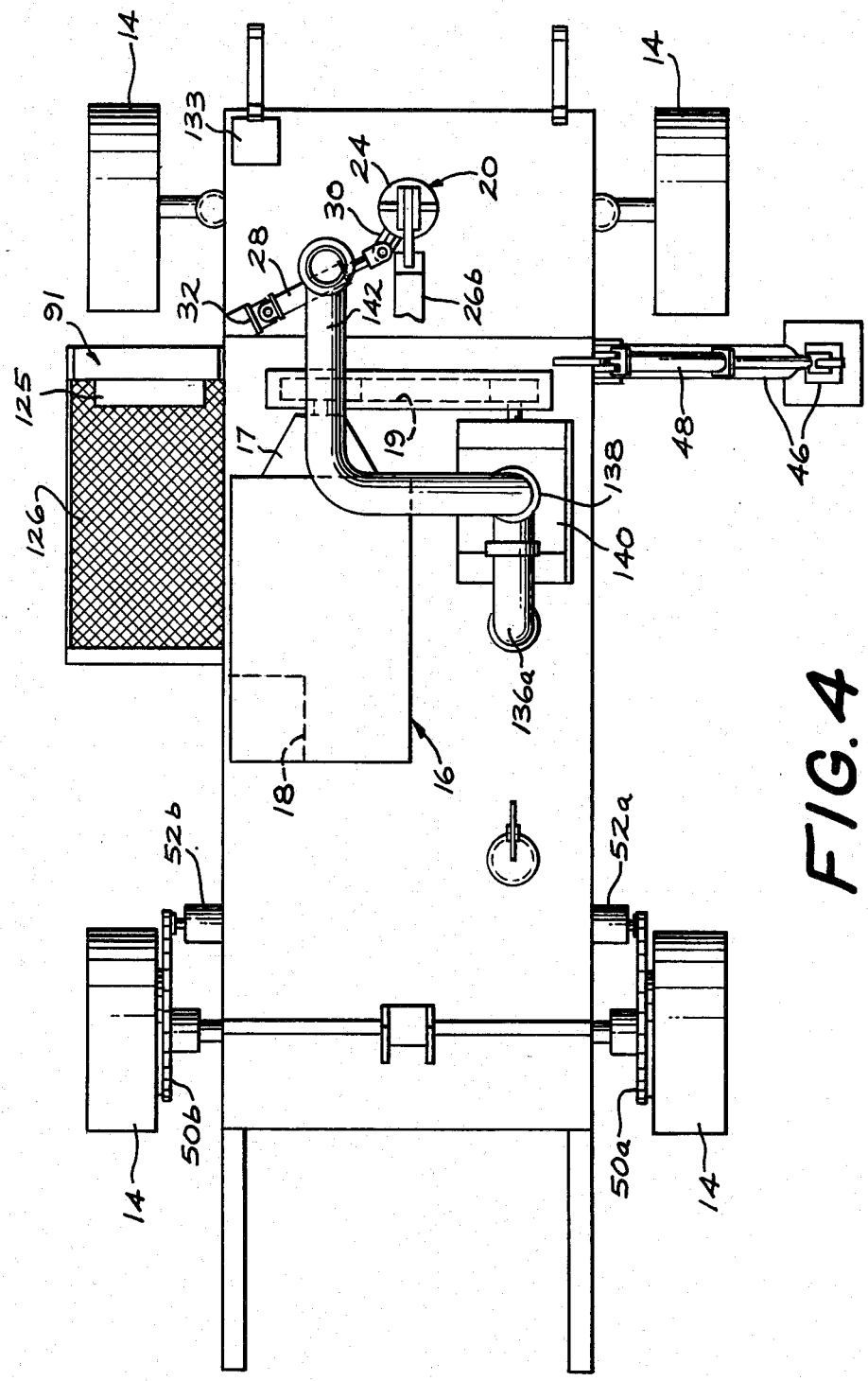
FIG. 4 shows a plan view of the machine of FIGS. 1-3 with the loading container and container supporting boom broken away.

When the control valves of valve body 91 are each in the locked position as shown in FIGS. 10a–c, hydraulic fluid is pumped by the pump 18 directly through each of those valves along a main flow line 129 to a pair of solenoid operated container dump valves 130a,b located in a housing 133 on a rear end portion of the frame 12 (See also FIGS. 1 and 4). The valves 130a,b are connected in tandem so that valve 130b is responsive to the operation of valve 130a. Valve 130b, in turn, simultaneously operates a pair of hydraulic cylinders 131a,b (See also FIG. 2). The cylinder 131a contains a piston rod which is connected to an elongated arm 132. The arm 132 is pivotally connected in two places to a pair of conventional butterfly valves 134a,b disposed in a pair of air inlet means or open ended elbows 136a,b, respectively, which, in turn, communicate with upper and lower end portions of a vertical pipe 138. The pipe 138 is connected on its lower end to a vacuum blower 140 which is belt driven by the engine power takeoff 17 and, on its upper end, through a rigid tube 142 and a flexible tube 144 to the suction pipe 75 on the container lid 62. The cylinder 131b contains a piston rod which is pivotally connected to a second valve means or butterfly valve 146 disposed in the pipe 138 between its joinder with the elbows 136a,b. The cylinders 131a,b are connected to butterfly valves 134a,b and 146, respectively, so that when the first two mentioned valves are closed, the latter valve is opened and vice versa. Accordingly, when the valves 134a,b are closed and the valve 146 is opened, the vacuum blower 140 is connected to the container 22 so as to draw a partial vacuum on the chamber 71 and, in turn, draw bulk material into the chamber through the pipe 76 and so as to hold the plate 80 in a closed position against the discharge opening in the base of the conical section 82. Conversely, when the valves 136a,b are opened and the valve 146 is closed, the container chamber 71 is rapidly exposed to ambient atmospheric pressure through the upper elbow 136a, upper end of the pipe 138, lines 142, 144 and pipe 75 so that the filter bags 72 will be back flushed by a rapid snapping action to free any material adhering to the outer surfaces thereof and so that the plate 80 will open under the weight of bulk material bearing thereon to discharge such material through the flue 88. At the same time that the chamber 71 is exposed to ambient atmosphere, the opened valve 134b connects the suction side of the vacuum pump 140 to ambient atmosphere through the lower elbow 136b to avoid excessive loading that would otherwise be placed on the pump as the result of closure of the valve 146. The high pressure side of the blower 140 is connected to a muffler 147 and, thereafter, vented to atmosphere.

Referring also to FIG. 11, a pair of electrical solenoids 148 a,b for operating the valve 130a to, in turn, operate the valve 130b is shown (See also FIG. 10c). The solenoid 148a is actuated to cause the valves 130a,b to operate the cylinders 131a,b to simultaneously open the butterfly valves 134a,b and close the butterfly valve 146 to rapidly expose the container chamber 71 to atmospheric pressure for back flushing the filter bags 72 and for dumping material through the flue 88. The solenoid 148a may be activated manually by means of a switch 150 located on the side of the container 22 (See also FIG. 1) which, when thrown to the upper position as viewed in FIG. 8, places a 12 volt d.c. potential 151 thereacross. The switch 150 may be of the spring return type so that the solenoid 148a will be manually activated to empty the container 22 only so long as manually depressed, upon release of which, the switch 150 will return to a neutral, disconnected position as shown in FIG. 11. Upon return of the switch 150 to its neutral position, a pair of biasing springs 152a,b (See FIG. 10c) will return the valve 130a to a locked position as shown which, in turn, returns the valve 130b to a locked position.

The solenoid switch 148b is activated to cause the valves 130a,b to operate the cylinders 131a,b to simultaneously close the butterfly valves 134a,b and open the butterfly valve 146 to connect the suction side of the vacuum blower 140 to the pipe 75 in the container lid 62 to draw a partial vacuum on the chamber 71 and pull bulk material therein through the pipe 76 from a remote source. This is accomplished in the circuit of FIG. 11 by placing the switch 150 in a downwardly contacting position as viewed while placing a switch 154 in an upwardly contacting position as viewed. A dual level hydraulic pressure sensitive switch 156 responsively connected along a hydraulic fluid monitoring line 158 (See FIGS. 1-2) to a lower end of the boom lift cylinder 40 is set so as to be in a downwardly contacting position as viewed when the container chamber 71 is empty. Under such initial conditions, the potential 151 will be applied across a coil 159 of a time delay relay switching means or relay 160 which, in turn, closes a switch 162 to energize the solenoid 148b. The relay 160 should be set to open the switch 162 after a short duration of closure, such as 3-4 seconds, so as to relieve the cylinders 131a,b from constant full pressure after having reached their maximum positions. Opening of the switch 162 in this manner will de-energize the solenoid 148b which will, in turn, return the valves 130a,b to their locked positions as shown to hold the cylinders 131a,b in the positions reached as a result of the initial closure of the switch 162. Now, as the container chamber 71 fills with bulk material, the pressure switch 156 will be forced toward its upwardly contacting position as viewed. Upon reaching such an upwardly contacting position, indicative of a measured quantity of material in the container chamber 71, the switch 156 will connect the potential 151 across a coil 164 of a time delay switching means or relay 166 to thus close a switch 168 and thereby energize the solenoid 148a to disconnect the vacuum pump 140 from the container chamber 71 and return the latter to ambient atmospheric pressure. As with the case involving the relay 160, the time delay relay 166 should be set to open the switch 168 within about 3-4 seconds after initial closure to de-energize the solenoid 148a and remove full hydraulic pressure from the cylinders 131a, b following their transition to the opposite extreme positions, bearing in mind that the locked valves 130a,b will thereafter maintain such cylinders in such states until reversed by future operation of solenoid 148b. A conventional manually resettable counter 169 is connected in parallel with the solenoid 148a so as to be actuated each time the solenoid 148a is actuated for counting the number of times the container 22 is emptied.

To complete the explanation of the hydraulic circuit of FIGS. 10a-c, hydraulic fluid pumped to the valves of the valve bodies 91 and 128 and the valves 130a,b is returned to a tank 170 (See also FIG. 1). Each of these valves are protected by standard pressure relief valves 172a,b and c which are connected as shown between the high pressure hydraulic fluid input lines to such valves and the tank 170. Fuel for the engine 16 is carried by a suitable tank 174 located under the frame 12 (See FIG. 1). Standard strainer filters 176 are used in the hydraulic fluid return line just upstream of the tank 170 as well as between the tank 170 and the low pressure end of the pump 18. The following table identifies componets of the hydraulic circuit of FIGS. 10a-c and of the electrical circuit of FIG. 11 which I have found suitable for use in a bulk material loading machine constructed according to the present example of my invention.

TABLE

| COMPONENTS | MANUFACTURER AND PART NUMBER |
| --- | --- |
| Hydraulic Pump 18 | Vickers V201P13P Gear Driven Vane |
| Valve Body 90 | Gressen 25-P-R-F/R-F/R-F/R-D-D D-D-D-O/HPCO |
| Valve Body 128 | Gressen SP-4-4-4-HP |
| Valve body 133 and Solenoids 148a and b | Parker D63W8C6K |
| Hydraulic Motors 52a and b | Orbmark HD116WZF |
| Cylinder 28 | PCM 9416 (4" × 16") |
| Cylinder 34 | PCM 9424 (4" × 24") |
| Cylinder 40 | PCM 5640 (4" × 40") |
| Cylinder 48 | PCM 9424 (4" × 24") |
| Cylinder 54 | PCM 9210 (3" × 10") |
| Cylinder 58 | PCM 9214 (3" × 14") |
| Cylinder 64 | PCM 9208 (3" × 8") |
| Cylinders 131a and b | Martner 1¼" × 6" |
| Hydraulic Pressure Switch 156 | ASCO PC 21A/RN20A21 dual level pressure switch |
| Time Delay Relays 160 and 166 | Potter-Brumfield R12-3012 × 2E1 |
| Counter 169 | Veeder Root 743895-216 |
| Vacuum Blower 140 | Schwitzer 4512 |
| Engine 16 | Cummins 4BT3.9P 4 cyl. diesel |

Although the subject invention has been described with respect to specific details of a certain preferred embodiment thereof, it is not intended that such details limit the scope and coverage of this patent otherwise than as specifically set forth in the following claims.

We claim:

1. A system for conveying a quantity of fluent particles of material comprising:
   a frame,
   a boom mounted on said frame, said boom comprising
      a first vertically extending section mounted on said frame, and
      a second section being vertically pivotally attached at one end to an upper end of said first section,
   a container being vertically pivotally connected to the other end of said second section, said container defining a hollow chamber therein and adapted to receive and thereafter discharge a quantity of fluent material, said container including
      air permeable particle filtration means disposed in said chamber,
      first air inlet means communicating with said chamber through said filtration means, and
      fluent material inlet means communicating with said chamber and bypassing said filtration means,
   fluent material discharge means for closing to permit said chamber to be charged with a fluent material and for opening to permit a quantity of fluent material to be discharged from said chamber,
   vacuum inducing means removably connectable to said first air inlet means for drawing a partial vacuum on said chamber through aid filtration means,
   switching means connected between said first air inlet means and said inducing means for, alternately, connecting said inducing means to said first air inlet means to draw a quantity of fluent material from a remote source into said chamber through said material inlet means, and for disconnecting said inducing means from said first air inlet means while simultaneously connecting said first air inlet means to ambient atmosphere to pneumatically backflush backflush said filtration means, said discharge means being closed while said inducing means is connected to said first air inlet means and being openable when said first air inlet means is connected to ambient atmosphere to permit discharge of a quantity of material from said chamber,
   a single acting hydraulic cylinder connected between said first and second sections of said boom for raising said container and for permitting said container to tiltably gravitate from an elevated to a lower position, and
   hydraulic pressure sensing means responsively connected to said single acting cylinder for sensing when the pressure of a hydraulic fluid in said single acting cylinder has increased to a predetermined maximum value, said pressure sensing means being operatively associated with said switching means for activating the latter upon the occurrence of said value to automatically discharge a measured quantity of fluent material from said chamber.

2. The system of claim 1 wherein said switching means comprises
   a pipe connected between said inducing means and air inlet means,
   second and third air inlet means communicating with opposite end portions of said pipe and opening into ambient atmosphere,
   a first pair of valves disposed in said second and third air inlet means and cooperating together for, alternately, connecting and isolating opposite end portions of said pipe to and from ambient atmosphere, and
   second valve means disposed in said pipe between said second and third air inlet means for closing when said first pair of valves is opened for disconnecting said inducing means from said first air inlet means and for opening when said first pair of valves is closed for connecting said inducing means to said first air inlet means.

3. The system of claim 2 further comprising
   a first hydraulic cylinder connected between said frame and first pair of valves for, alternately, opening and closing the latter simultaneously, and
   a second hydraulic cylinder connected between said frame and second valve means for, alternately, closing said second valve means when said first pair of valves is opened and for opening said second valve means when said first pair of valves is closed.

4. The system of claim 3 further comprising
   first hydraulic control valve means having a forward, reverse and lock position operatively connected to said first and second cylinders,
   means for biasing said first control valve means to said lock position wherein said cylinders are maintained in either of two opposite extreme positions,
   a first electrical solenoid operatively connected to said first control valve means for shifting said first and second cylinders to first opposite extreme positions wherein said first pair of valves is opened and said second valve means is closed to discharge a fluent material from said chamber, and
   a second electrical solenoid operatively connected to said first control valve means for shifting said first and second cylinders to second opposite extreme conditions wherein said first pair of valves is closed and said second valve means is opened to draw a fluent material into said chamber from a remote source.

5. The system of claim 4 further comprising
   first time delay switching means operatively connected to said first solenoid for activating said first solenoid upon command to empty a fluent material from said chamber and for deactivating said first solenoid at a first predetermined time following activaction thereof such that said first control valve means will shift to said lock position under the influence of said biasing means while maintaining said first and second cylinders in said first opposite extreme positons, and
   second time delay switching means operatively connected to said second solenoid for activating said second solenoid to draw a fluent material into said chamber and for de-activating said second solenoid at a second predetermined time following activation thereof, whereby said first control valve means will shift to said lock position while maintaining said first and second cylinders in said second opposite extreme positions,
   means for manually activating said first time delay means, and
   means for manually activating said second time delay means.

6. The system of claim 5 wherein said second section comprises inner and outer telescopically connected elements.

7. The system of claim 1 wherein said second section comprises inner and outer telescopically movable elements.

8. The system of claim 7 further comprising
means for rotating said first section,
means for extending and retracting the elements of said second section relative to one another, and
means for leveling said container.

9. The system of claim 8 further comprising
a first control station mounted on said frame for separately controlling said single acting cylinder, rotating means, extending and retracting means and leveling means, and
a second control station attached to said container for separately controlling said single acting cylinder, rotating means and extending and retracting means.

10. The system of claim 1 wherein said hydraulic pressure sensing means comprises a hydraulic pressure sensive switch.

11. The system of claim 1 wherein said material discharge means comprises a counterweighted plate pivotally attached to said container for sealing an outlet orifice in the base of said container while a partial vacuum is drawn on said chamber and for opening said orifice under the weight of a quantity of fluent material disposed in said chamber to discharge said fluent material from said chamber when said chamber is exposed to ambient atmosphere through said first air inlet means.

12. The system of claim 1 wherein said frame is mobile and self-propelled.

13. The system of claim 12 further comprising
a first pair of wheels rotatably connected to one end portion of said frame,
a second pair of wheels rotatably connected to an opposite end portion of said frame,
a pair of hydraulic motors operatively connected to different ones of said first pair of wheels for driving said frame in a forward and reverse direction, and
hydraulically operated steering means connected between said frame and said second pair of wheels.

14. The system of claim 1 wherein said filtration means is removably disposed in said container.

15. The system of claim 1 wherein said switching means also connects said inducing means to ambient atmosphere when said inducing means is disconnected from said first air inlet means to protect said inducing means from overload.

16. A system for conveying a quantity of fluent particles of material comprising:
a frame;
a boom mounted on said frame, said boom comprising
a first vertically extending section mounted on said frame; and
a second section containing telescopically connected elements, said second section being vertically pivotally attached at one end to an upper end of said first section;
a container being vertically pivotally attached to the other end of said second section, said container defining a hollow chamber therein and adapted to receive and thereafter discharge a quantity of fluent material, said container including
an air permeable particle filtration means disposed in said chamber;
first air inlet means communicating with said chamber through said filtration means;
fluent material inlet means communicating with said chamber and bypassing said filtration means; and
fluent material discharge means for closing to permit said chamber to be charged with a fluent material and for opening to permit a quantity of fluent material to be discharged from said chamber;
vacuum inducing means removably connectable to said first air inlet means for drawing a partial vacuum on said chamber through aid filtration means;
a pipe connected between said inducing and air inlet means;
second and third inlet means communiciating with opposite end portions of said pipe and opening into ambient atmosphere;
a first pair of valves disposed in said second and third air inlet means and cooperating together for, alternately, connecting and isolating opposite end portions of said pipe to and from ambient atmosphere;
second valve means disposed in said pipe between said second and third air inlet means for closing when said first pair of valves is opened for disconnecting said inducing means from said first air inlet means and for opening when said first pair of valves is closed for connecting said inducing means ot said first air inlet means;
a first hydraulic cylinder connected between said frame and first pair of valves for, alternately, opening and closing the latter simultaneously;
a second hydraulic cylinder connected between said frame and second valve means for, alternately, closing said second valve means when said first pair of valves is opened and for opening said second valve means when said first pair of valves is closed;
first hydraulic control valve means having a forward, reverse and lock position operatively connected to said first and second cylinders;
means for biasing said first control valve means to said lock position wherein said cylinders are maintained in either of two opposite extreme positions;
a first electrical solenoid operatively connected to said first control valve means for shifting said first and second cylinders to first opposite extreme positions wherein said first pair of valves is opened and said second valve means is closed to discharge a fluent material from said chamber;
a second electrical solenoid operatively connected to said first control valve means for shifting said first and second cylinders to second opposite extreme conditions wherein said first pair of valves is closed and said second valve means is opened to draw a fluent material into said chamber from a remote source;
first time delay switching means operatively connected to said first solenoid for activating said first solenoid upon command to empty a fluent material from said chamber and for deactivating said first solenoid at a first predetermined time following activation thereof such that said first control valve means will shift to said lock position under the influence of said biasing means while maintaining said first and second cylinders in said first opposite extreme positions;
second time delay switching means operatively connected to said second solenoid for activating said second solenoid to draw a fluent material into said chamber and for deactivating said second solenoid at a second predetermined time following activation thereof, whereby said first control valve means will shift to said lock positon while maintaining said first and second cylinders in said second opposite extreme positions;

means for separately activating said first and second time delay switching means manually;

a third single acting hydraulic cylinder connected between said first and second sections of said boom for raising said container and for permitting said container to tiltably gravitate from an elevated to a lower position; and a hydraulic pressure senitive switch responsively connected to said third cylinder for sensing when the pressure of a hydraulic fluid in said third cylinder has increased to a predetermined maximum value, said pressure sensitive switch being operatively connected to said first time delay switching means for activating the latter upon occurrence of said value to automatically discharge a fluent material from said chamber.

* * * * *